(12) United States Patent
Peterson et al.

(10) Patent No.: US 7,520,518 B2
(45) Date of Patent: Apr. 21, 2009

(54) WHEELCHAIR

(75) Inventors: Christopher J. Peterson, Tierra Verde, FL (US); Matthew Robert Cerreto, South Amherst, OH (US)

(73) Assignee: Invacare Corporation, Elyria, OH (US)

( * ) Notice: Subject to any disclaimer, the term of this patent is extended or adjusted under 35 U.S.C. 154(b) by 268 days.

(21) Appl. No.: 11/258,488

(22) Filed: Oct. 25, 2005

(65) Prior Publication Data

US 2006/0087098 A1    Apr. 27, 2006

Related U.S. Application Data

(60) Provisional application No. 60/621,761, filed on Oct. 25, 2004.

(51) Int. Cl.
*B62M 1/14* (2006.01)
*A61G 5/10* (2006.01)

(52) U.S. Cl. ............... 280/250.1; 280/304.1; 280/650; 280/657; 403/231

(58) Field of Classification Search ............. 280/250.1, 280/304.1, 650, 657; 403/231
See application file for complete search history.

(56) References Cited

U.S. PATENT DOCUMENTS

| | | | |
|---|---|---|---|
| 3,883,257 A * | 5/1975 | Delafield | 403/172 |
| 5,267,745 A | 12/1993 | Robertson et al. | |
| 5,320,373 A | 6/1994 | Robertson et al. | |
| 5,409,247 A * | 4/1995 | Robertson et al. | 280/250.1 |
| 5,688,086 A * | 11/1997 | Menzemer et al. | 410/68 |
| 5,722,676 A * | 3/1998 | Wu | 280/250.1 |
| 5,853,651 A | 12/1998 | Lindsay et al. | |
| 5,938,365 A * | 8/1999 | Grewe et al. | 403/231 |
| 6,089,778 A * | 7/2000 | Hirano et al. | 403/231 |
| 6,604,750 B2 * | 8/2003 | Malassigne et al. | 280/250.1 |
| 2002/0166595 A1 | 11/2002 | Lindsay | |
| 2003/0196716 A1 | 10/2003 | Lindsay | |
| 2004/0173991 A1 | 9/2004 | Watterton et al. | |

OTHER PUBLICATIONS

Time for Discovery, Kuschall designed for life, Oct. 2003.
Equipment for the Physically Challenged, Kuschall, www.epc-wheelchairs.co.uk/wheel/kusch.htm, website visited Oct. 22, 2004, 5 pages.
Kuschall Fusion, Kuschall, www.kueschall.ch/en/COMPET_895.asp, website visited Oct. 22, 2004, 1 page.

(Continued)

*Primary Examiner*—Paul N Dickson
*Assistant Examiner*—Marlon A Arce
(74) *Attorney, Agent, or Firm*—Calfee, Halter & Griswold LLP

(57) ABSTRACT

A wheelchair frame member that includes a first metallic tube member, a second metallic tube member, and a tubular composite member. First and second end portions of the composite member extend into the first and second metallic tube members. The first and second end portions of the composite members are secured to inner surfaces of the first and second metallic tube members. The end portions of the tubular composite members may be connected to the inner surfaces of the metallic tube members in a variety of different ways. For example, the end portions may be forced radially outward into engagement with the inner surface of the tube members to secure the end portions to the inner surfaces of the tube members.

10 Claims, 15 Drawing Sheets

OTHER PUBLICATIONS

Bi/Fusion Briefing, Vyatek Sports, Inc., www.vyatek.com/VYATEK/BiFusion.php, website visited Oct. 21, 2004, 2 pages.

The Future of Bicycle Design Today, Titus Cycles: ExoGrid & IsoGrid Explained, www.titusti.com/exo_iso.html, website visited Oct. 21, 2004, 2 pages.

What is IsoGrid Technology?, IsoGrid Technology, www.isogridtechnology.com/IGT/Pages/whatis.html, website visited Oct. 21, 2004, 1 page.

How Does IsoGrid Work?, IsoGrid Technology, www.isogridtechnology.com/IGT/Pages/advantage.html, website visited Oct. 21, 2004, 1 page.

Technical Advantages of IsoGrid, IsoGrid Technology, www.isogridtechnology.com/IGT/Pages/advantage.html, website visited Oct. 21, 2004, 3 pages.

Product Applications of IsoGrid, IsoGrid Technology, www.isogridtechnology.com/IGT/Pages/apply.html, website visited Oct. 21, 2004, 1 page.

\* cited by examiner

WHEELCHAIR

RELATED APPLICATIONS

The present application claims priority to, and any other benefit of, U.S. provisional patent application No. 60/621,761, filed on Oct. 25, 2004, entitled "Wheelchair." The entire disclosure of U.S. provisional patent application No. 60/621,761 is incorporated herein by reference.

FIELD OF THE INVENTION

The present application relates generally to wheelchairs, and discloses a variety of wheelchair features, including frame members made from a combination of composite and metallic materials, adjustable wheel mounts, front caster assemblies, and footrest adjustment mechanisms.

BACKGROUND OF THE INVENTION

Wheelchairs are an important means of transportation for a significant portion of society. Whether manual or powered, wheelchairs provide an important degree of independence for those they assist. In the past, many typical wheelchair frames have been constructed primarily from metal tubing materials. The wheelchair frame is formed from lengths of metal tubing that are bent or otherwise suitably shaped to define individual frame components. The frame components are then interconnected by welding or the like to form the wheelchair frame. The wheelchair frame structures can be of a rigid unitary construction when assembled, or otherwise adapted to fold to a collapsed condition for easy transport and/or storage.

SUMMARY

The present application relates to wheelchair frame members made from a combination of composite and metallic materials. One exemplary wheelchair frame member includes a first metallic tube member, a second metallic tube member, and a tubular composite member. First and second end portions of the composite member extend into the first and second metallic tube members. The first and second end portions of the composite members are secured to inner surfaces of the first and second metallic tube members. The end portions of the tubular composite members may be connected to the inner surfaces of the metallic tube members in a variety of different ways. For example, the end portions may be forced radially outward into engagement with the inner surface of the tube members to secure the end portions to the inner surfaces of the tube members.

DETAILED DESCRIPTION

Figure 1:
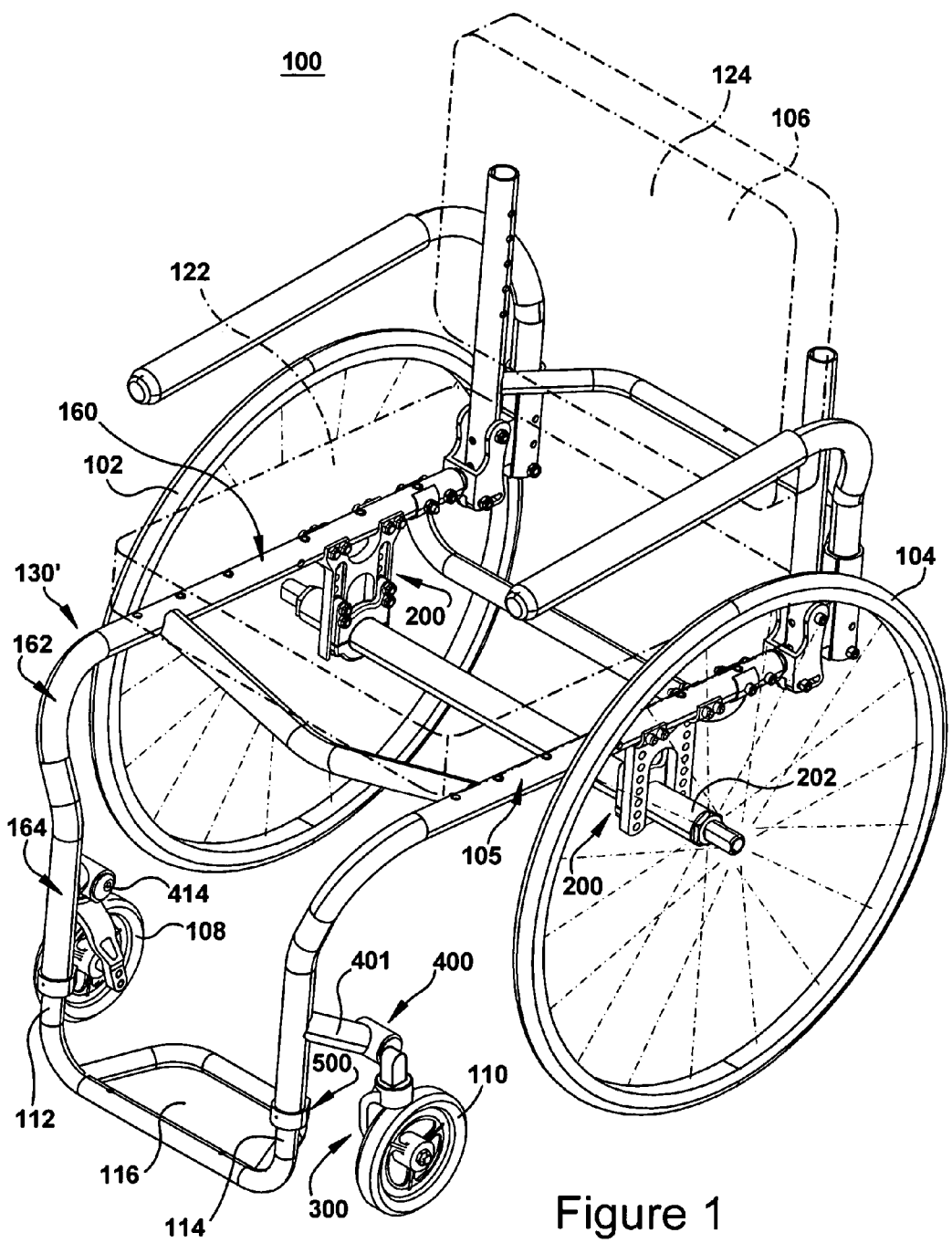
FIG. 1 is a perspective view of an exemplary wheelchair that includes frame members with metallic portions and a composite portion.

Referring to FIG. 1, this detailed description discloses an exemplary wheelchair 100 that includes several features. Any one of the disclosed features, or any combination of any two or more of the disclosed features, may be claimed herein or in one or more later filed continuation or divisional applications. These features include: frame members 130, 130', 130" made from a combination of composite and metallic materials, adjustable drive wheel mounts 200, 200' a caster assembly 300 with a single mounting flange wheel support, an adjustable caster assembly mount 400, and a footrest mounting assembly 500. The illustrated adjustable drive wheel mounts 200, 200' allow adjustment of the drive wheels with respect to the frame. The caster assembly mount 400 allows rotation of the caster assembly with respect to the frame when the mount is in an unsecured state and prevents rotation of the of the caster assembly with respect to the wheelchair frame when the mount is in a secured state. The illustrated footrest mounting assembly 500 eliminates the need to include a relief slit or channel in the footrest mounting tube of the frame.

Figure 1A:
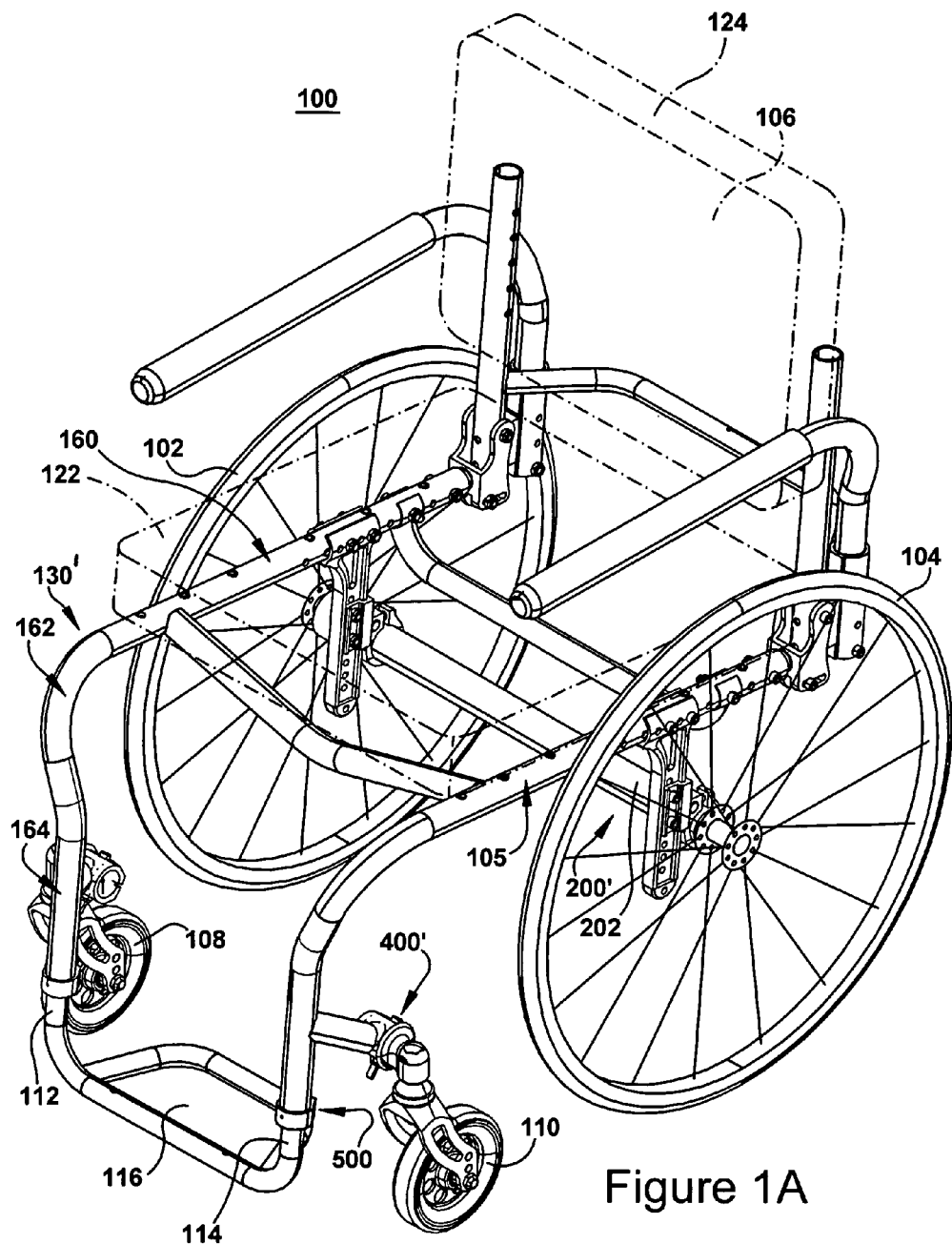
FIG. 1A is a perspective view of an exemplary wheelchair that includes frame members with metallic portions and a composite portion.

FIGS. 1 and 1A illustrate two examples of exemplary wheelchairs 100. The present invention is not limited to the wheelchair embodiments illustrated by FIGS. 1 and 2. The wheelchair features disclosed by the present application can be used in any type of wheelchair, including but not limited to, manually driven wheelchairs, motor driven wheelchairs, wheelchairs with rigid frames, and wheelchairs with folding frames. The illustrated wheelchairs 100 each have a pair of drive wheels 102 and 104 and a frame 105 supported by the drive wheels. A chair 106, front casters 108 and 110 and front riggings 112 and 114 are supported by the frame 105. The front riggings 112 and 114 include a footrest 116 for supporting the feet of a passenger. The chair 106 has a seat portion 122 and a back portion 124 for comfortably seating a passenger.

Combined Tubular and Metallic Frame Member

Figure 2:
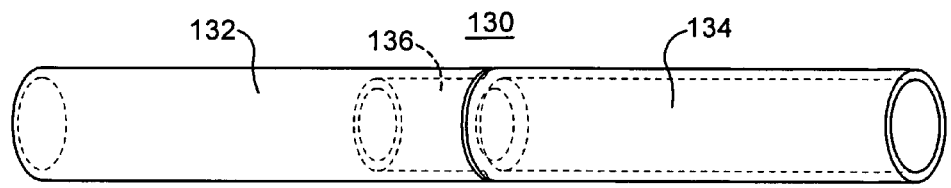
FIG. 2 is a schematic illustration of an exemplary wheelchair frame member that includes a composite portion and a metallic portion.
Figure 8:
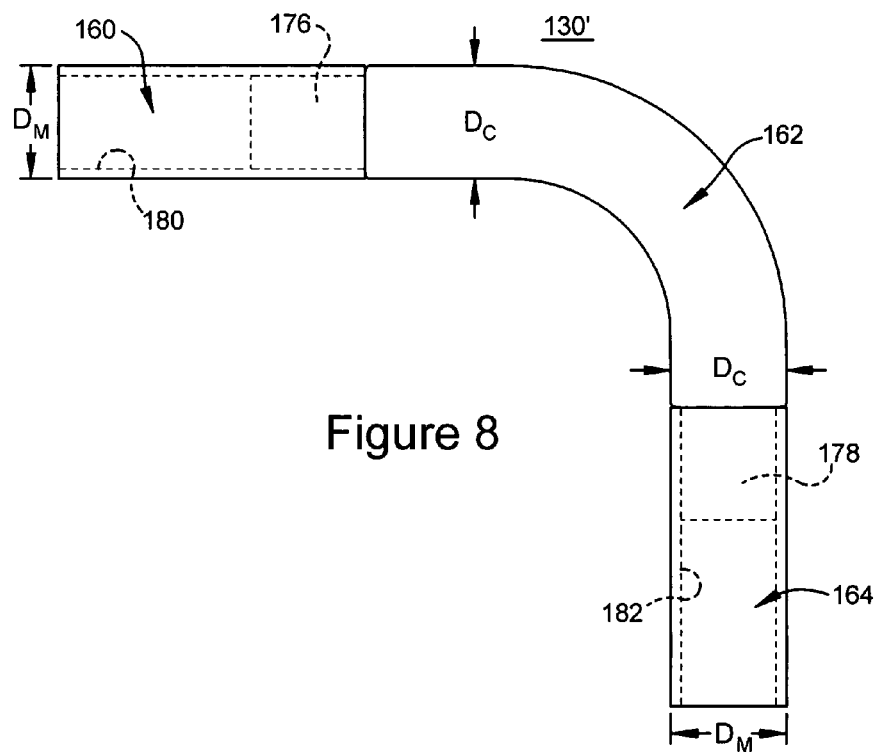
FIG. 8 is a schematic illustration of an exemplary wheelchair frame member that includes a composite portion and first and second metallic portions.

Referring to FIGS. 1, 1A, 2, and 8, one aspect of the present application is a tubular wheelchair frame member 130, 130', 130" that includes a tubular metallic member and a tubular composite member. The frame member can take a wide variety of different forms. For example, FIG. 2 illustrates an example of a frame member with a straight composite member 134 and FIG. 8 illustrates an example of a frame member with a curved composite member 162. In the example illustrated by FIG. 2, the composite member 134 includes an end portion 136 that extends into a metallic tubular member 132. The metallic tubular member 132 and the composite tubular member 134 are joined together to form an integral frame member 130. The metallic tubular members and the tubular composite members may be formed with a wide variety of different cross-sectional shapes. In the examples illustrated by FIGS. 2 and 8, the metallic tubular members and the composite tubular members have a generally circular cross-section. The metallic tubular members and composite tubular members may have virtually any cross-sectional shape, including but not limited to, oval, polygonal, and teardrop. The metallic tubular members may be made from a wide variety of different metals, and metal alloys, including but not limited to titanium. The composite members (such as exemplary members 134, 162) may be made from a wide variety of different materials, including but not limited to carbon fiber.

FIG. 8 illustrates an exemplary frame member 130' that may be used on the left and right sides of the exemplary wheelchair illustrated by FIG. 1. The frame member 130' includes a first metallic tube member 160, a second metallic tube member 164, and a curved tubular composite member 162. The curved composite member has first and second end portions 176, 178 that extend into the first and second metallic tube members 160, 164. The first and second end portions 176, 178 are secured to inner surfaces 180, 182 of the first and second metallic tube members 160, 164. In one exemplary embodiment, the end portions 176, 178 are forced radially outward into engagement with the inner surfaces 180, 182 to secure the curved composite member 162 to the first and second metallic tube members 160, 164.

Figure 3:
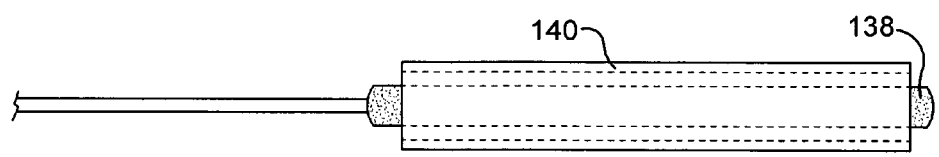
FIG. 3 schematically illustrates an exemplary inflatable mandrel placed in a composite material.
Figure 4:
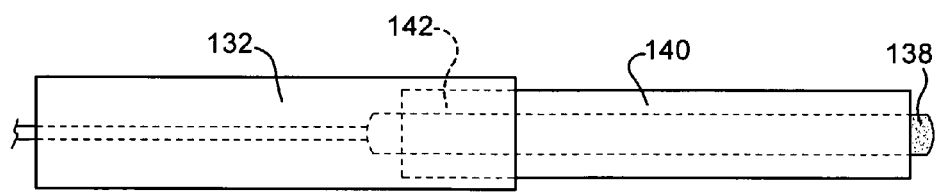
FIG. 4 schematically illustrates an exemplary end portion of composite material placed in a metallic tube.
Figure 5:
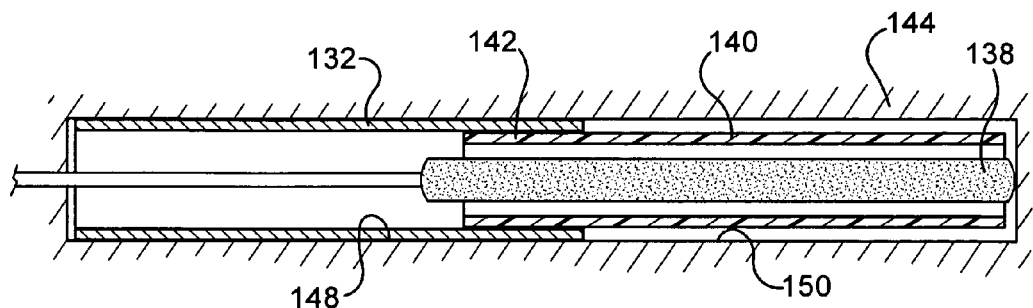
FIG. 5 schematically illustrates composite material and a metallic tube member placed in a mold.
Figure 6:
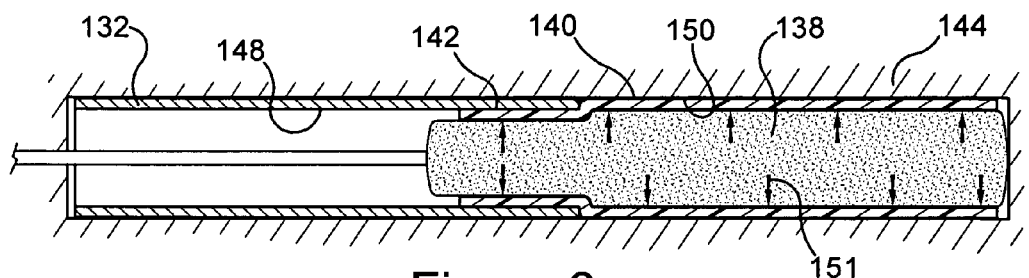
FIG. 6 schematically illustrates inflation of a mandrel to force composite material outward against a mold surface and an inner surface of a metallic tube member.
Figure 7:
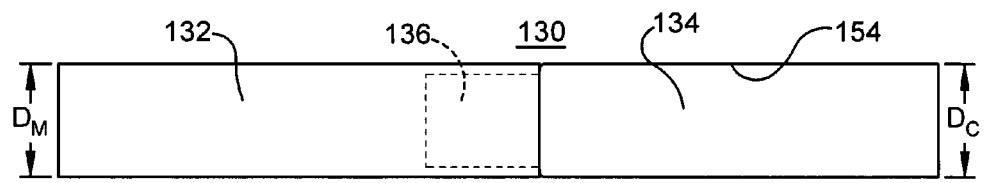
FIG. 7 is a schematic illustration of an exemplary wheelchair frame member that includes a composite portion and a metallic portion.

FIGS. 3-6 illustrate one exemplary method that can be employed to make the straight frame member 130 illustrated by FIG. 2. Referring to FIG. 3, an inflatable mandrel 138 is positioned within material 140 that forms the composite tubular portion. Referring to FIG. 4, a portion 142 of the material 140 that forms the composite member end portion 136 is inserted into the metallic tubular portion 132. Referring to FIG. 5, the inflatable mandrel 138, the metallic tubular portion 132, and the material 140 that forms the composite tubular member are placed into a mold 144. Heat is applied to the mandrel 138 and/or the mold 144 to heat the material 140 that forms the composite tubular portion 134. The metallic tubular portion 132 may also be heated by applying heat to the mandrel and/or the mold. Referring to FIG. 6, the mandrel 138 is inflated to force the material 140 that forms the composite tubular portion 134 against an inner surface 148 of the metallic tubular portion 132 and against a surface 150 of the mold 144 as indicated by arrows 151. Heat and pressure are applied for a predetermined period of time. After the predetermined period of time elapses, the wheelchair frame member 130 is allowed to cool and the mandrel 138 is deflated. Referring to FIG. 7, the formed wheelchair frame member 130 is removed from the mold 144 and assembled to other components to form the wheelchair frame 105. The composite tubular portion 134 is bonded to the metallic tubular portion 132 by the method illustrated by FIGS. 3-6.

Referring to FIGS. 5-7, the mold 144 can be configured such that an outer diameter $D_M$ of the metallic tubular portion 132 and an outer diameter $D_C$ of the composite tubular member 134 are substantially the same. As a result, the transition from the metallic tubular portion 132 to the composite tubular portion 134 is smooth.

Figure 4A:
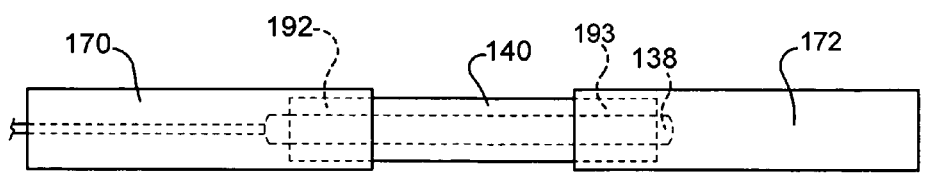
FIG. 4A schematically illustrates exemplary first and second end portions of composite material placed in first and second metallic tubes.
Figure 5A:
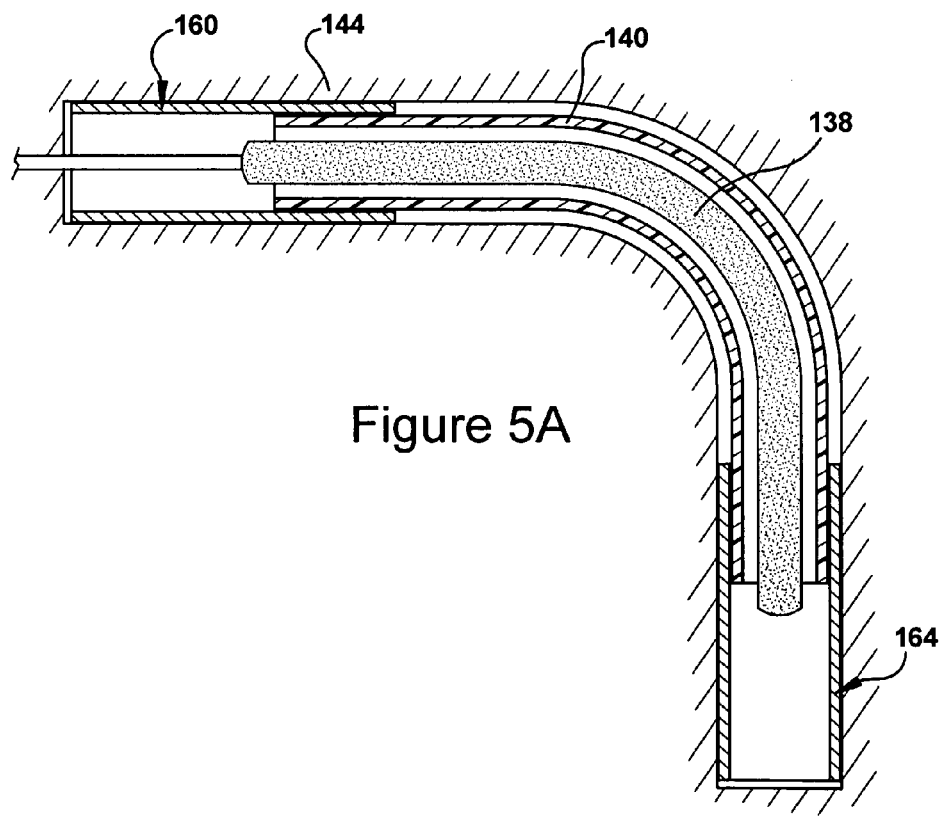
FIG. 5A schematically illustrates composite material and two metallic tube members placed in a mold.
Figure 6A:
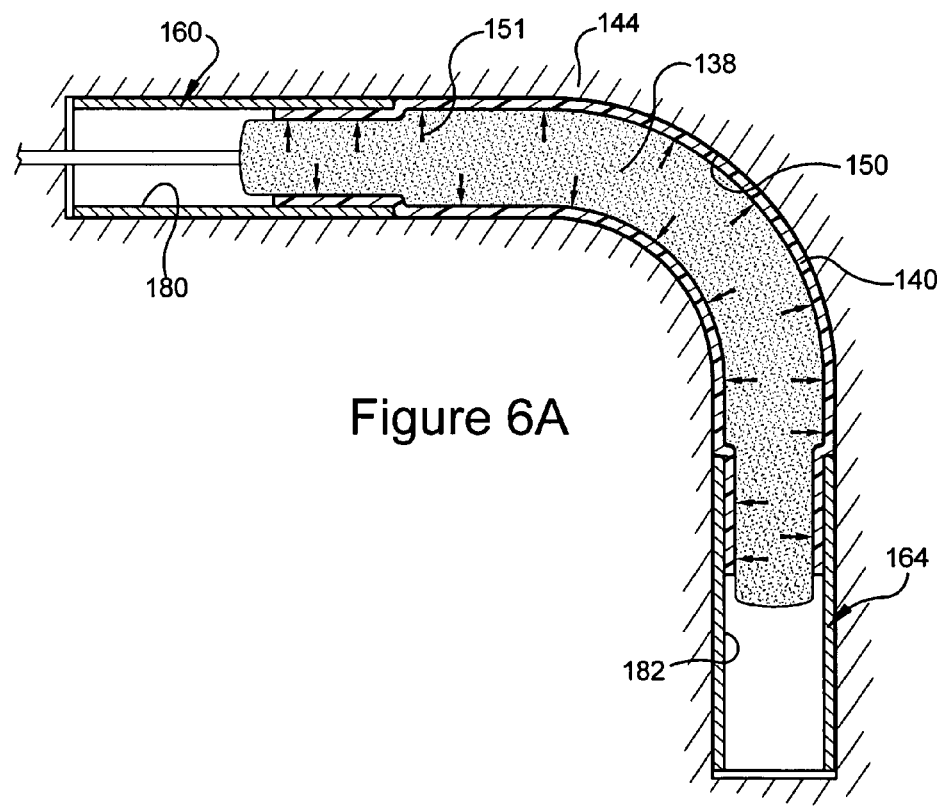
FIG. 6A schematically illustrates inflation of a mandrel to force composite material outward against a mold surface and inner surfaces of metallic tube members.

FIGS. 4A, 5A, 6A and 8 illustrate one method that can be employed to join the metallic tubular members 160, 164 to a curved composite tubular member 162 to form an integral "L" shaped wheelchair frame member. Referring to FIG. 4A, an inflatable mandrel 138 is positioned within material 140 that forms the composite tubular portion. The material may be initially straight as shown in FIG. 4A or may be applied around the mandrel in a curved configuration that corresponds roughly to the shape of the formed curved composite member. Portions 192, 193 of the material 140 that form the composite member end portions 176, 178 are inserted into the metallic tubular members 160, 164. Referring to FIG. 5A, the inflatable mandrel 138, the metallic tubular members 160, 164, and the material 140 that forms the composite tubular member are placed into a mold 144. The material is placed in a curved configuration by the mold. Heat is applied to the mandrel 138 and/or the mold 144 to heat the material 140 that forms the composite tubular member 162. The metallic tubular member 162 may also be heated by applying heat to the mandrel and/or the mold. Referring to FIG. 6A, the mandrel 138 is inflated to force the material 140 that forms the curved composite tubular member 162 against inner surfaces 180, 182 of the metallic tubular members 160, 164 and against a surface 150 of the mold 144 as indicated by arrows 151. Heat and pressure are applied for a predetermined period of time. After the predetermined period of time elapses, the wheelchair frame member 130' is allowed to cool and the mandrel 138 is deflated. The formed wheelchair frame member 130' is removed from the mold 144 and assembled to other components to form the wheelchair frame 105. The curved composite tubular member 162 is bonded to the metallic tubular members by the method illustrated by FIGS. 4A-6A.

Referring to FIGS. 5A, 6A and 8, the mold 144 can be configured such that an outer diameter $D_M$ of the metallic tubular members 160, 164 and an outer diameter $D_C$ of the curved composite tubular member 162 are substantially the same. As a result, transitions between the metallic tubular members 160, 164 and the curved composite tubular members 162 are smooth.

Figure 9:
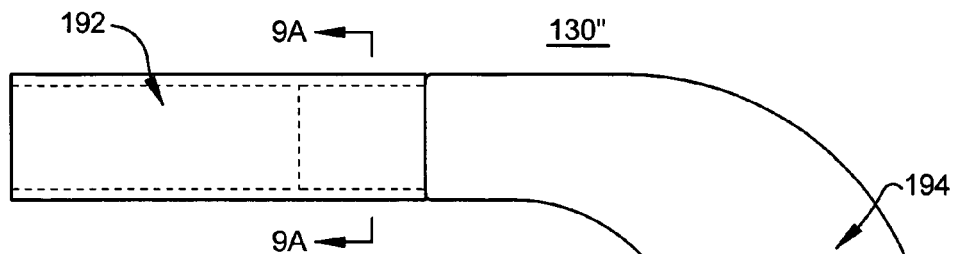
FIG. 9 is a schematic illustration of an exemplary wheelchair frame member that includes a composite portion and first and second end portions having dissimilar cross-sections.
Figure 9A:
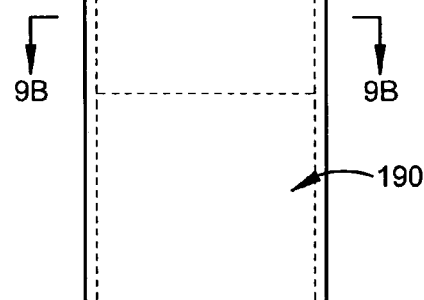
FIG. 9A is a sectional view taken along the plane indicated by lines 9A-9A in FIG. 9.
Figure 9A:
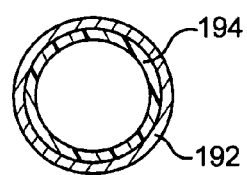
Figure 9B:
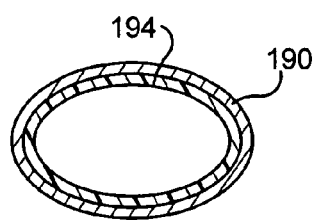
FIG. 9B is a sectional view taken along the plane indicated by lines 9B-9B in FIG. 9.
Figures 10A, 10B:
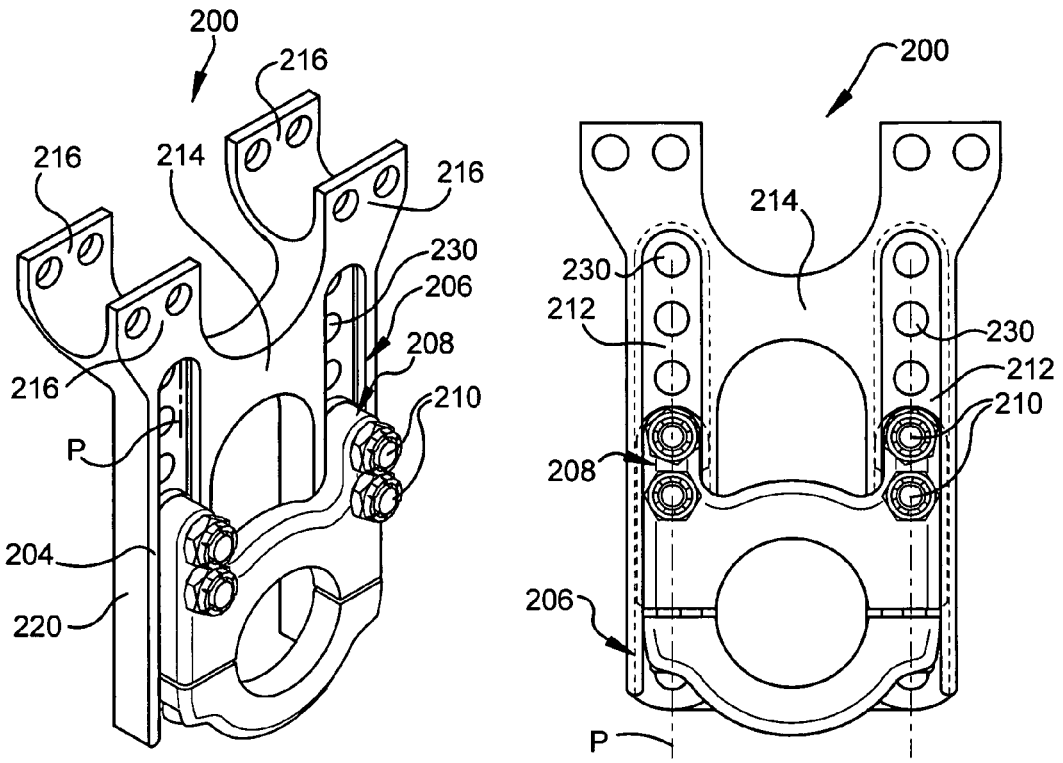
FIG. 10A is a perspective view of an exemplary adjustable wheel mount.
FIG. 10B is an elevational view of the exemplary adjustable wheel mount illustrated by FIG. 10A.

In the example illustrated by FIG. 8, the first metallic tube member 160, and the second metallic tube member 164 have a generally circular cross-section and have substantially the same diameter. In one exemplary embodiment, the first metallic tube member 160 and the second metallic tube member 164 have different outer diameters, different inner diameters and/or different cross-sectional shapes. In this embodiment, the mold 144 is configured such that the composite tubular member 162 smoothly transitions between two metallic tube members 160, 164 having dissimilar outer diameters, dissimilar inner diameters, and/or dissimilar shapes. In the example illustrated by FIGS. 9, 9A and 9B, another wheelchair frame member 130" includes an oval metallic tubular member 190, a round metallic tubular member 192, and a tubular composite member 194 that transitions from an oval cross-section at one end to a round cross-section at the other end. The transition between the oval metallic tubular member 190 to the tubular composite member 194 and the transition between the round metallic tubular member 192 and the tubular composite member 194 may be smooth.

U.S. Pat. No. 5,853,651 to Lindsay et al. (herein the '651 patent) discloses a method of making hollow component structures. The methods disclosed in the '651 patent can be adapted to apply the composite material to the mandrel 138 and used in accordance with the teachings herein. The '651 patent discloses a method of forming hollow composite structures from laminates of fiber reinforced synthetic resins. According to the method, the tubes are manufactured by wrapping a hollow semi-rigid inner mandrel with layers of composite sheets. The sheets are made from high-strength fibers impregnated with thermosetting or thermoplastic resins. The material 140 can be applied to the mandrel 138 in the manner disclosed in the '651 patent and used in accordance with the teachings herein. U.S. Pat. No. 5,853,651 is incorporated herein by reference in its entirety.

U.S. Patent Application Publication No. 2003/0196716 to Lindsay (herein the '716 application) discloses a method of manufacturing multi-material tube structures. In the '716 application, an original metallic tube structure (e.g., steel, aluminum, titanium or the like) is modified with a secondary operation such as machining, punching, laser cutting or the like to remove various portions of the original tube wall, resulting in a tube with some pattern of "holes" or "cutaway" sections. The metal tube with the holes is placed in a mold assembly and composite materials are molded inside the metal tube resulting in a part metal and part composite tube. The method of molding the composite materials inside the metal tube disclosed in the '716 application can be adapted to fuse the end of the composite portion 134 inside the metallic tubular portion 132. U.S. Patent Application Publication No. 2003/0196716 to Lindsay is incorporated herein by reference in its entirety.

In one exemplary embodiment, the composite tubular member herein (e.g., member 134, member 162, or member 194) further comprises ribs (not shown) extending radially inward from an interior surface 154 of the composite tubular member. The ribs add to the strength of the tube. U.S. Patent Application Publication No. 2002/0166595 discloses tubular structures that are enhanced by incorporating ribs on the inside diameter of composite tubes. U.S. Patent Application Publication No. 2002/0166595 is incorporated herein by reference in its entirety.

The exemplary frame members 130' depicted in the examples of FIGS. 1, and 1A include a metallic seat support portion defined by the first metallic tubular member 160, a carbon fiber elbow defined by the composite tubular member 162, and a metallic footrest supporting portion defined by the second metallic tubular member 164. The carbon fiber elbow includes first and second end portions that are connected by a curved portion. The carbon fiber elbow is fused to the seat support portion and the footrest supporting portion by molding the carbon fiber elbow with the material that forms the end portions disposed in the tubes 160, 164 that form metallic seat support portion and the footrest supporting portion. The carbon fiber elbow may be like curved composite member 162 shown in FIG. 8 and discussed above and one method of molding the carbon fiber elbow 162 with the material that forms the end portions disposed in the tubes that form metallic seat support portion 160 and the footrest supporting portion 164 is exemplified by FIGS. 4A, 5A, and 6A.

Adjustable Drive Wheel Mounts

Figure 13:
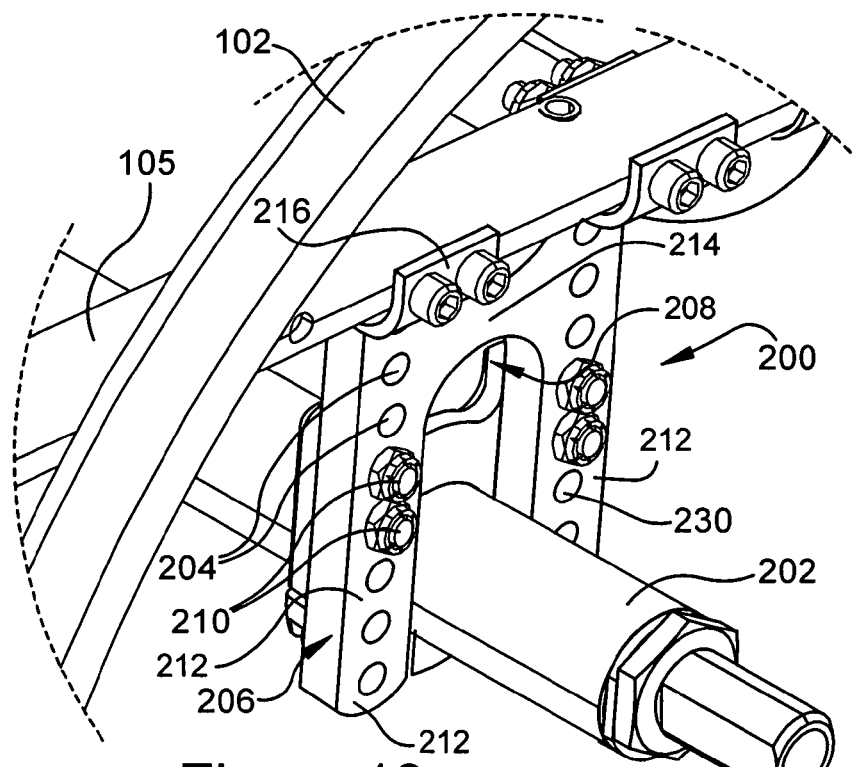
FIG. 13 is a perspective view of an exemplary adjustable wheel mount coupled to a wheel support.
Figure 14:
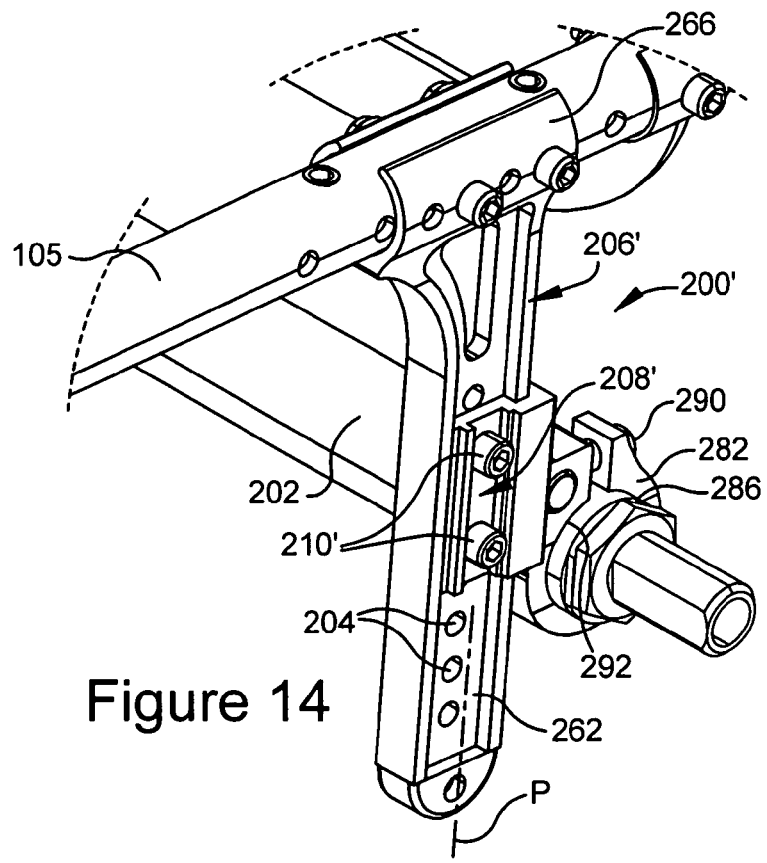
FIG. 14 is a perspective view of another exemplary adjustable wheel mount coupled to a wheel support.

Referring to FIGS. 1, 1A, and 10A-14, another aspect of the present application is an adjustable mount for adjustably coupling two members together. FIGS. 13 and 14 illustrate examples of adjustable mounts 200, 200' coupled to a wheel support 202 and the frame 105. The adjustable mounts 200, 200', also shown in FIGS. 1 and 1A, position the wheel supports 202 with respect to the frame 105 at a selected one of a plurality of positions defined by the mount. Referring to FIGS. 10A, 10B, 11, 12, 13 and 14, the adjustable mounts 200, 200' include a guide 206, 206', a following member 208, 208' or follower, and a fastener 210, 210'. The guide defines a path of travel P. The following member 208, 208' is coupled to the guide 206, 206' such that adjustment of a position of the following member with respect to the guide is limited to movement along the path of travel P. The fastener 210, 210' fixes the position of the following member 208, 208' with respect to the guide 206, 206' to secure the wheel support at the selected position.

Figure 11:
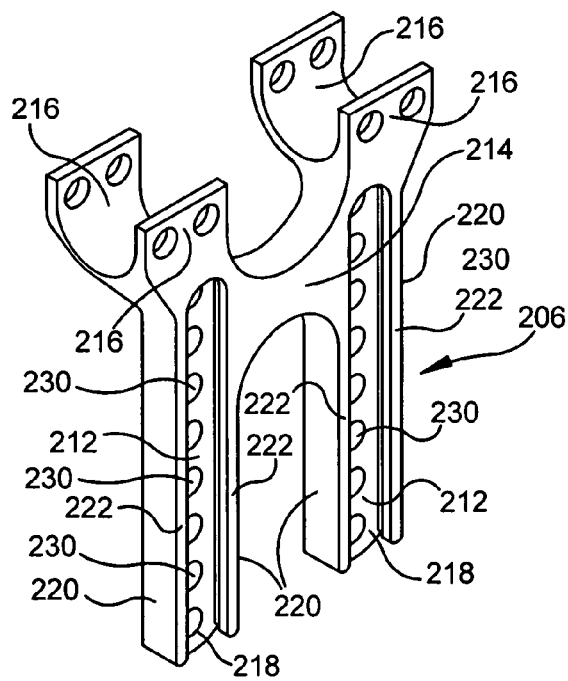
FIG. 11 is a perspective view of a guide member of the mount illustrated by FIGS. 10A and 10B.
Figure 12A:
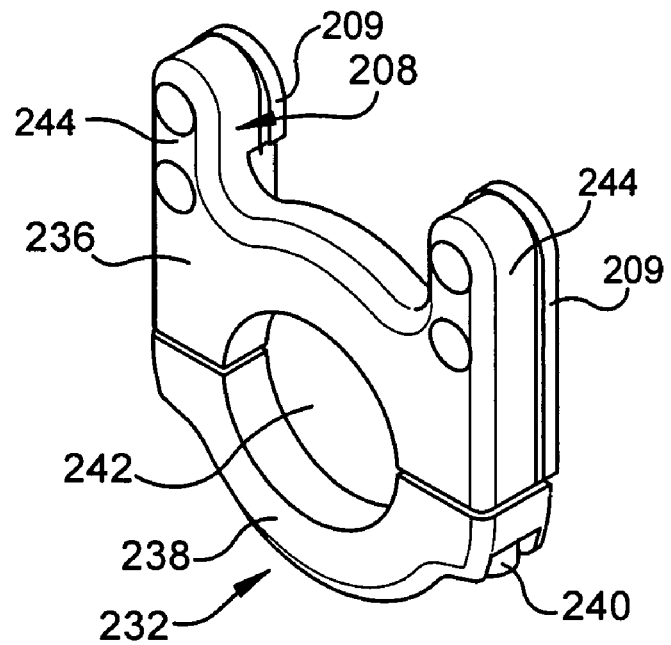
FIG. 12A is a perspective view of a bracket assembly of the mount illustrated by FIGS. 10A and 10B.
Figure 12B:
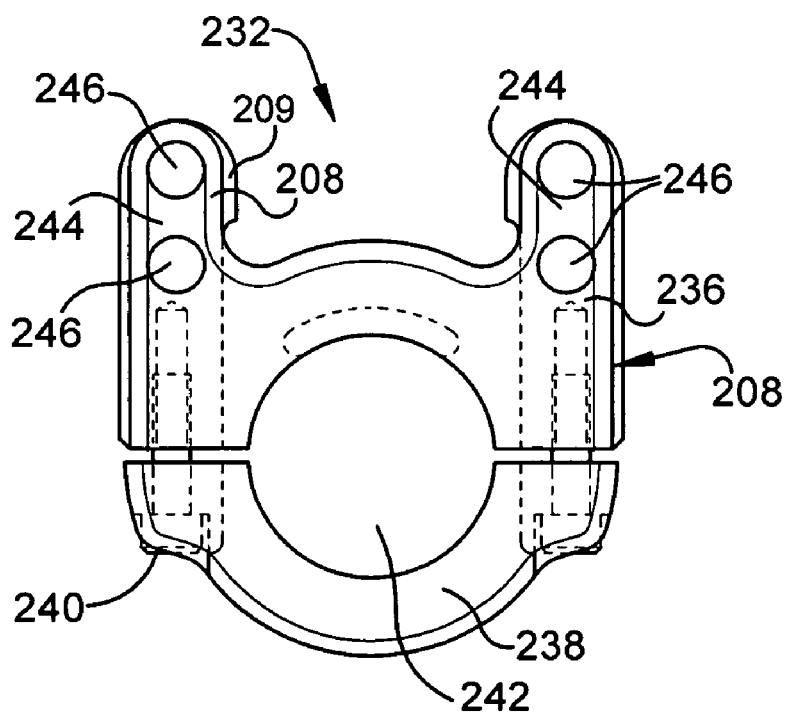
FIG. 12B is an elevational view of a bracket assembly of the mount illustrated by FIGS. 10A and 10B.

FIGS. 1, 10A, 10B, 11 and 13 illustrate a first example of an adjustable mount 200. Referring to FIG. 11, the guide 206 comprises a pair of spaced apart elongated channels 212 that are connected by a web 214. Frame mounting flanges 216 extend from the web 214. Referring to FIG. 11, each channel 212 includes a base wall 218, a pair of side walls 220 that extend from the base wall, and a pair of retaining flanges 222 that extend inward from the side walls to form grooves on each side of each of the channels 212. The illustrated channels 212 define the linear path of travel P. A discrete number of positions are defined by the guide 206. In the examples shown, the discrete number of positions is defined by the plurality of aligned pairs of openings 230 or holes through the channels 212.

A spacing between the mounting flanges 216 corresponds to a size of a frame element of the wheelchair frame 105. The flanges 216 are secured to the frame 105 to connect the guide 206 to the frame. The following member 208 is secured to the wheel support 202 in the example illustrated by FIG. 13. It should be readily apparent that the guide 206 could be connected to the wheel support 202 and the following member 208 could be connected to the frame 105.

In the example illustrated in FIGS. 1, 10A, 10B, 11, 12, and 13, the following member 208 is formed as part of a bracket assembly 232 that secures the wheel support 202, which is illustrated as a rear camber tube. Axles of the drive wheels 102, 104 are rotatably mounted to the support 202. Referring to FIGS. 12A and 12B, the bracket assembly 232 includes an upper member 236, a lower member 238, and fasteners 240. The upper member 236 and the lower member 238 define an opening 242. Tightening of the fasteners 240 reduces the size of the opening 242 to clamp the support 202 in the bracket assembly 232. In the example, the upper member includes a pair of legs 244. The spacing between the legs 244 corresponds to the spacing between the channels 212. In the example, the following member 208 includes a protrusion 209 that extends from each of the legs 244. The illustrated pairs of spaced apart following member protrusions 209 fit within the grooves defined by the channels 212 and are constrained to linear movement along the length of the channels. When the legs 244 are placed in the channels 212 and the following member protrusions 209 are placed in the grooves of the channels, the wheel support 202 is positioned between the channels. The legs 244 slide in channels 212, guided by the protrusions within the grooves. Mounting openings 246 or holes are included through each leg 244. The fasteners 210 extend through the mounting openings 246 and channel openings 230 and are tightened to fix the position of the drive wheels with respect to the frame.

FIGS. 1A and 14 illustrate a second example of an adjustable mount 200'. The guide 206' of this mount 200' comprises an elongated channel 262. Mounting flanges 266 extend from the channel 262. The illustrated channel 262 defines the linear path of travel P. A spacing between the mounting flanges 266 corresponds to a size of a frame element of the wheelchair frame 105. The flanges 266 are secured to the frame 105 to connect the guide 206' to the frame. The following member 208' is secured to the wheel support 202, which is a camber tube in the example.

In the example illustrated in FIGS. 1A and 14, the following member 208' is connected to a bracket assembly 282 that secures the wheel support. The bracket assembly 282 includes a clamping member 286 and a fastener 290. The clamping member 286 defines an opening 292. Tightening of the fastener 290 reduces the size of the opening 292 to clamp the support 202, which is a camber tube in the example, in the bracket assembly 282. The following member 208' fits within the channel 262 and is constrained to linear movement along the length of the channel.

To adjust the position of the illustrated mounts 200, 200', the following member slides with respect to the guide 206, 206' to a desired position. The holes in the following member are aligned with corresponding holes 230 in the guide that are at the desired position. In the illustrated example, fasteners are inserted through the holes to secure the position of the drive wheel with respect to the frame.

Caster Assembly

Figure 15:
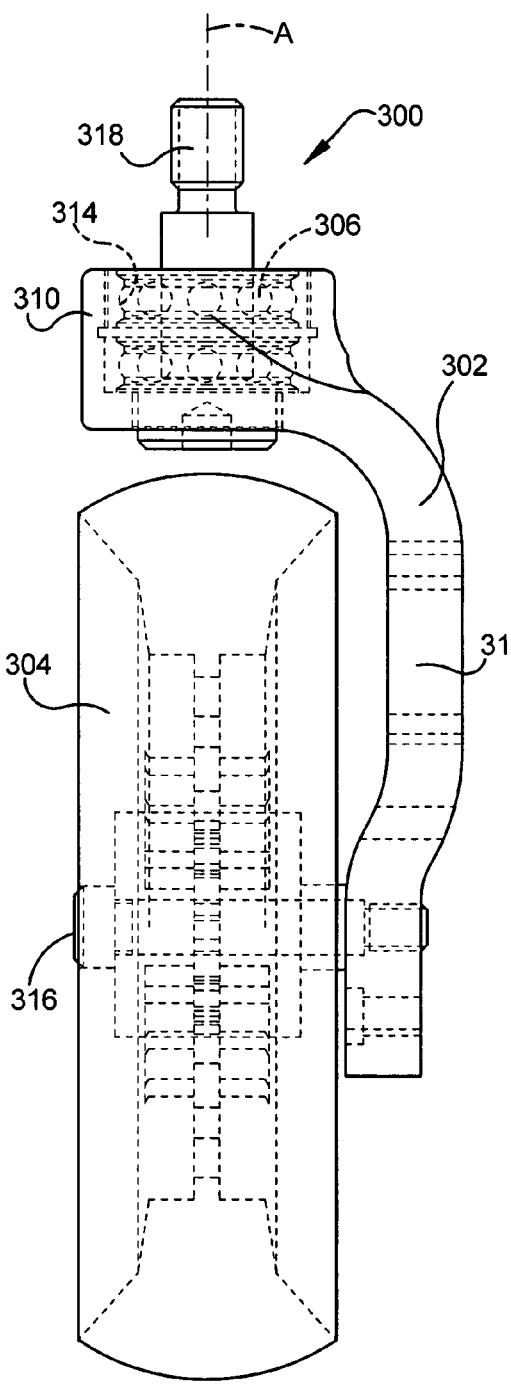
FIG. 15 is an elevational view of an exemplary caster assembly.

Another aspect of the present application is a caster assembly. FIGS. 1 and 15 illustrate an improved caster assembly 300. The exemplary caster assembly 300 is rotatably connected to the wheelchair frame 105. Referring to FIG. 15, the caster assembly 300 includes a wheel support 302, a wheel 304 and a bearing assembly 306. The wheel support 302 includes a bearing housing portion 310 and a single wheel mounting flange 312 extending from the bearing housing portion 310, which bearing housing portion 310 and single wheel mounting flange 312 may be integrally formed in a variety of different ways, for example by casting, from a variety of different materials, such as metals, including but not limited to steel and aluminum. The bearing housing portion 310 includes a bearing recess 314. The wheel 304 is rotatably connected to the mounting flange with a shoulder screw 316. The bearing assembly 306 is seated in the recess 314 of the bearing housing portion 310. A shoulder screw 318 extends through the bearing assembly 306 and is attached to the frame 105 by a caster assembly mount. The bearing assembly 306 facilitates rotation of the wheel support 302 about an axis A defined by the fastener 318.

Caster Adjustment

Yet another aspect of the present application is a caster assembly mount. FIGS. 1, 1A, 16A, 16B, 17A and 17B illustrate examples of adjustable caster assembly mounts 400, 400'. In the example illustrated by FIGS. 1, 16A and 16B, a wedge 402 (FIG. 16B) is used to lock the rotational position of the caster assembly 300 with respect to the frame 105 (FIG. 1). The frame 105 includes a caster support tube 401. A generally horizontally extending caster mounting tube 404 is connected to the support tube 401. The caster mounting tube 404 includes a passage 406 that defines an interior surface 408. The caster assembly 300 may be selectively pivoted about an axis B as indicated by arrow 410 (FIG. 16B to adjust the position of the caster when the mount is loosened. The caster mount 400 includes a wedge portion 402 that extends into the caster mounting tube 404 and a caster assembly mounting portion 403. A fastener 414 is coupled to the mount 400. Tightening of the fastener 414 urges the wedge portion 402 into the passage 406 and into frictional engagement with the interior surface 408. The frictional engagement secures the caster mount to the tube to prevent rotation of the caster mount with respect to the tube. Loosening of the fastener 414 allows the caster mount 400 and thus the caster assembly to rotate with respect to the tube. The caster assembly 300 is rotatably connected to the caster attachment portion 403 by the shoulder screw 318.

Figure 16A:
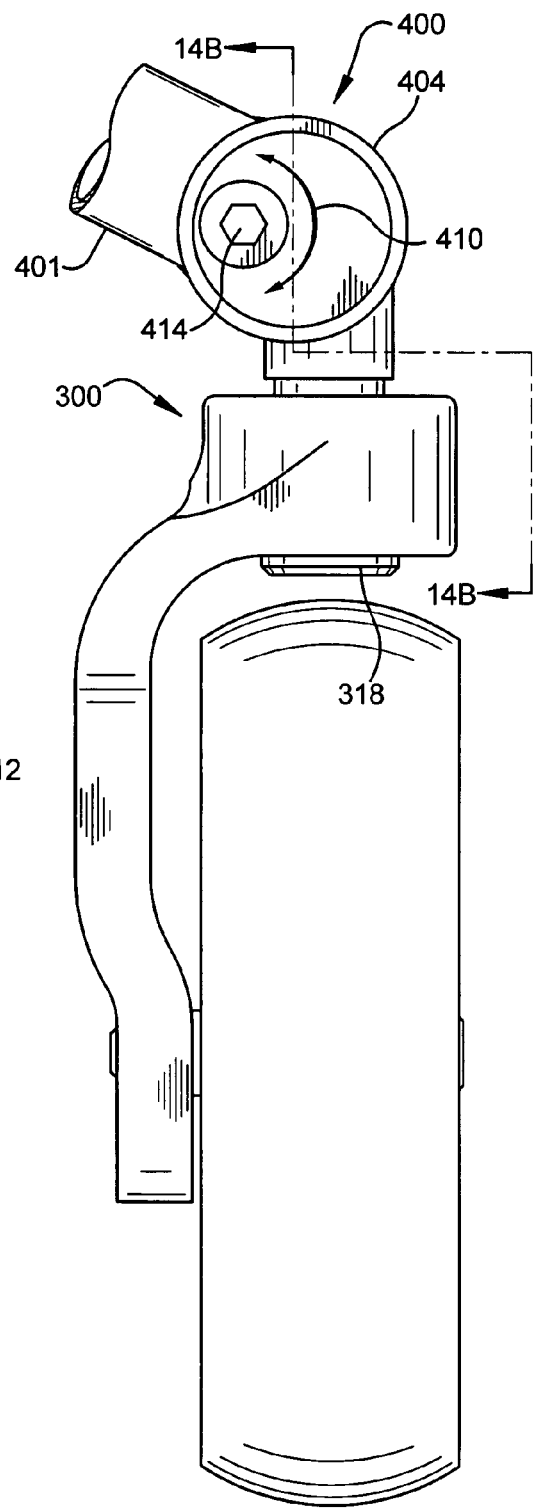
FIG. 16A is an elevational view of an exemplary caster assembly adjustment mechanism.
Figure 16B:
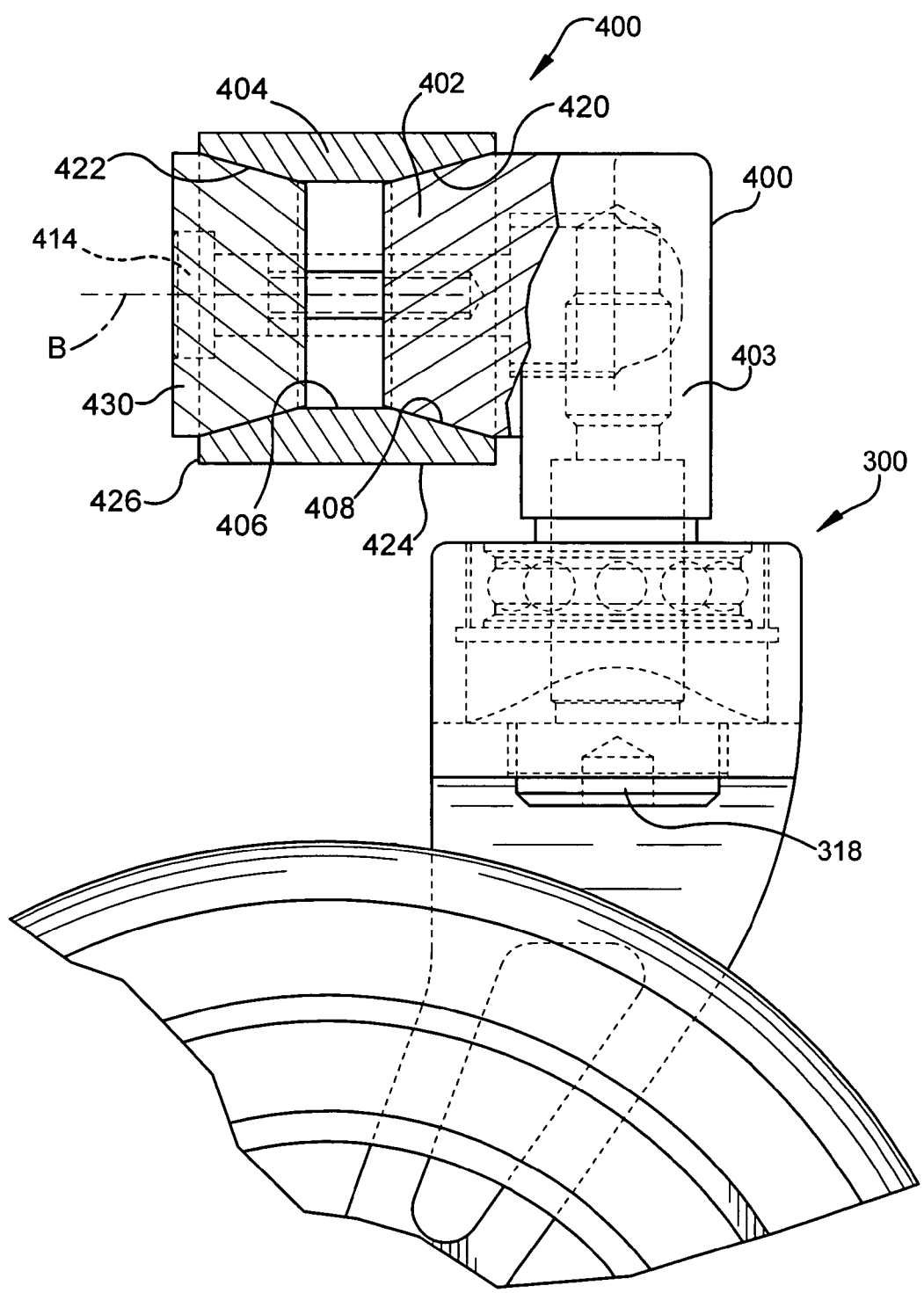
FIG. 16B is an elevational view of an exemplary caster assembly adjustment mechanism.

In the caster assembly mount example illustrated by FIGS. 16A and 16B, first and second frustoconical surfaces 420, 422 are defined in the caster mounting tube 404. The first frustoconical surface 420 has a decreasing radial extent as the first frustoconical surface extends inward from a first end 424 toward a midpoint of the tube. The second frustoconical surface 422 has a decreasing radial extent as the second frustoconical surface extends inward from a second end 426 toward the midpoint of the tube. In the example, the wedge portion 402 of the caster mount 400 is frustoconical. The wedge portion 402 has an exterior surface that cooperates with the first frustoconical surface 420. A wedge member 430 has an outer frustoconical surface that cooperates with the second frustoconical surface 422. In the example, the fastener 414 connects the wedge member 430 and the caster mount 400. Tightening of the fastener 414 urges the wedge portion 402 into the first frustoconical surface 420 and urges the wedge member 430 into the second frustoconical surface 422 to secure the caster mount to the tube. Loosening of the fastener 414 allows the caster mount rotate with respect to the tube.

Casters tend to impact obstructions, such as curbs. Impacting obstructions with the casters tends to loosen fasteners that are used to adjust the position of the caster assembly. In one exemplary embodiment, the fastener 414 tightens when the caster impacts an obstruction. In the example of FIG. 1, the fastener 414 used to tighten the caster mount 400 on the right side 436 of the frame 105 is a right hand threaded fastener. Similarly, the fastener (not shown in FIG. 1) used to tighten the caster mount 400 on the left side 438 of the frame 105 is a left hand threaded fastener. In this example, using a right hand threaded fastener on the right side and a left hand threaded fastener on the left side tightens the wedges (frustoconical surfaces or other wedge surfaces) when force is applied to the casters from the front.

Figure 17A:
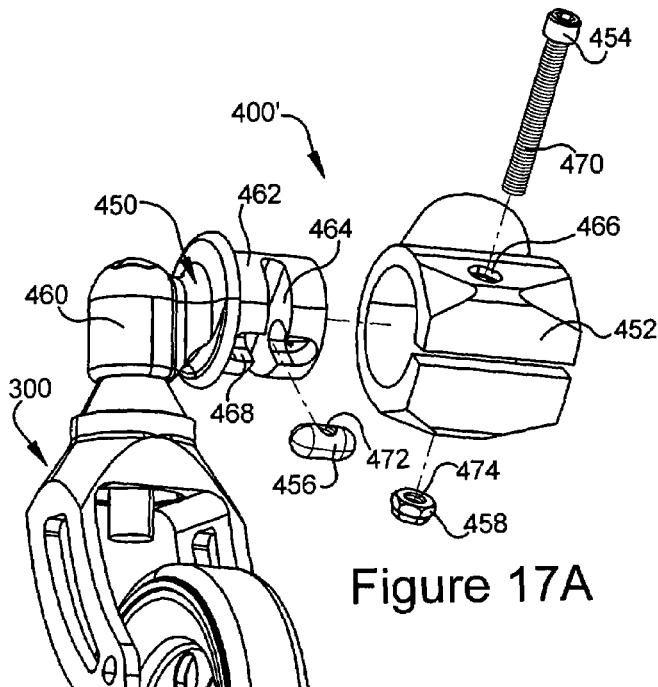
FIG. 17A is an exploded perspective view of an exemplary adjustable caster assembly mount.
Figure 17B:
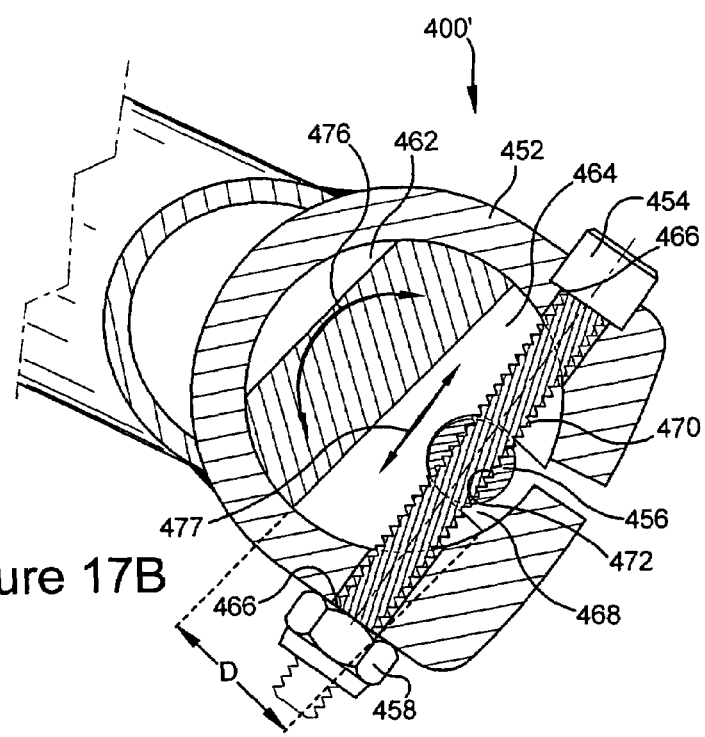
FIG. 17B is a sectional view of the caster assembly mount shown in FIG. 17A.
Figure 18:
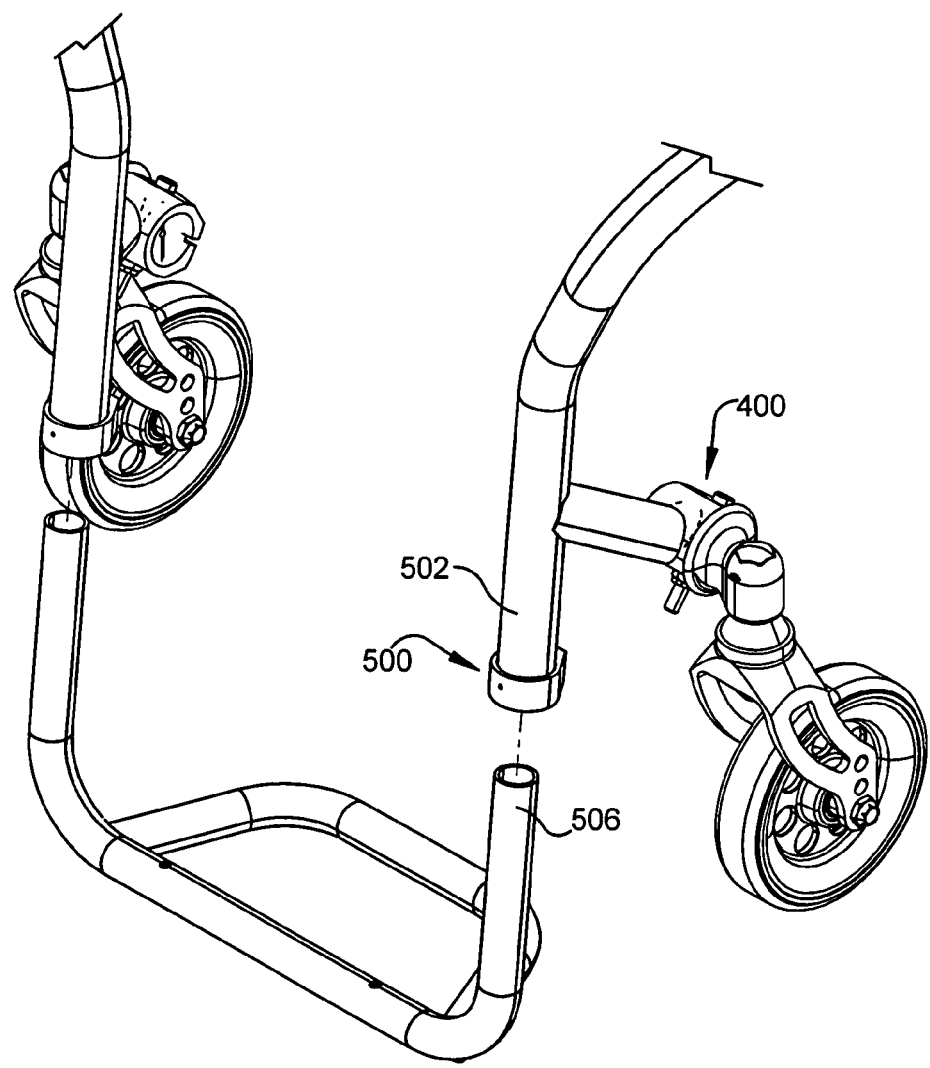
FIG. 18 is an exploded perspective view of an exemplary footrest support assembly.
Figure 19:
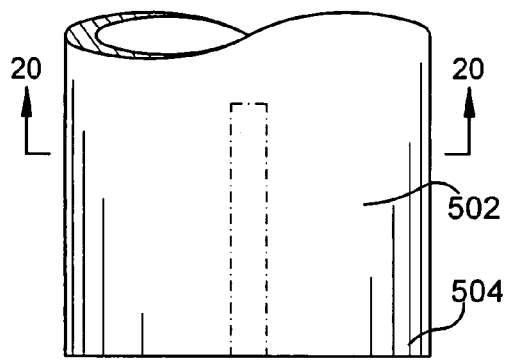
FIG. 19 is a side elevational view of an exemplary footrest support mounting tube.
Figure 20:
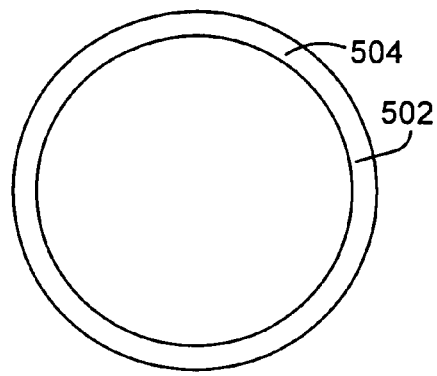
FIG. 20 is a view taken along lines 20-20 in FIG. 19.

In the caster assembly mount example illustrated by FIGS. 1A, 17A and 17B, the adjustable caster assembly mount 400' includes a fork mount member 450, a fork mount clamp 452, an adjustment screw 454, a threaded adjustment member 456, and a clamping fastener 458. The fork mount member 450 includes a tube portion 460 and a generally cylindrical portion 462 that extends transversely with respect to the tube portion. The caster assembly 300 is rotatably connected to the tube portion 460. The generally cylindrical portion 462 is received by the fork mount clamp 452, such that the cylindrical portion 462 is rotatable with respect to the fork mount clamp 452. A slot 464 is defined through the cylindrical portion 462 such that the slot is generally perpendicular to an axis of the cylindrical portion. In the example illustrated by FIGS. 17A and 17B, the depth of the slot is approximately equal to the radius of the cylindrical portion 462. A pair of openings 466 in the clamp 452 is in alignment with the slot 464. The adjustment screw 454 extends through the openings 466 in the clamp and is disposed in the slot 464 of the cylindrical portion 462. An axial cutout 468 in the cylindrical portion 462 intersects the slot 464. The threaded adjustment member 456 is disposed in the cutout 468. External threads 470 of the adjustment screw 454 are disposed in internal threads 472 of the adjustment member 456. The clamping fastener 458 includes internal threads 474 that the external threads 470 at the end of the adjustment screw 454 engage. When the clamping fastener 458 is tightened, the fork mount clamp 452 clamps against the fork mount member 450 to secure the position of the caster assembly 300 with respect the axis defined by the fork mount clamp. When the clamping fastener 458 is loosened, the caster assembly 300 may be selectively pivoted as indicated by arrow 476 by rotating the adjustment screw 454. Rotating the adjustment screw 454 moves the adjustment member 456 in the clamp 452 as indicated by arrow 477. The adjustment member 456 engages the generally cylindrical portion 462 of the fork mount member to rotate the cylindrical portion 462 with respect to the clamp 452 and thereby adjust the position of the fork mount member 450. Once adjusted, the clamping fastener 458 is tightened to secure the position of the caster assembly 300 relative to the caster support tube 401 and the frame 105.

Footrest Adjustment Clamp

Figure 21:
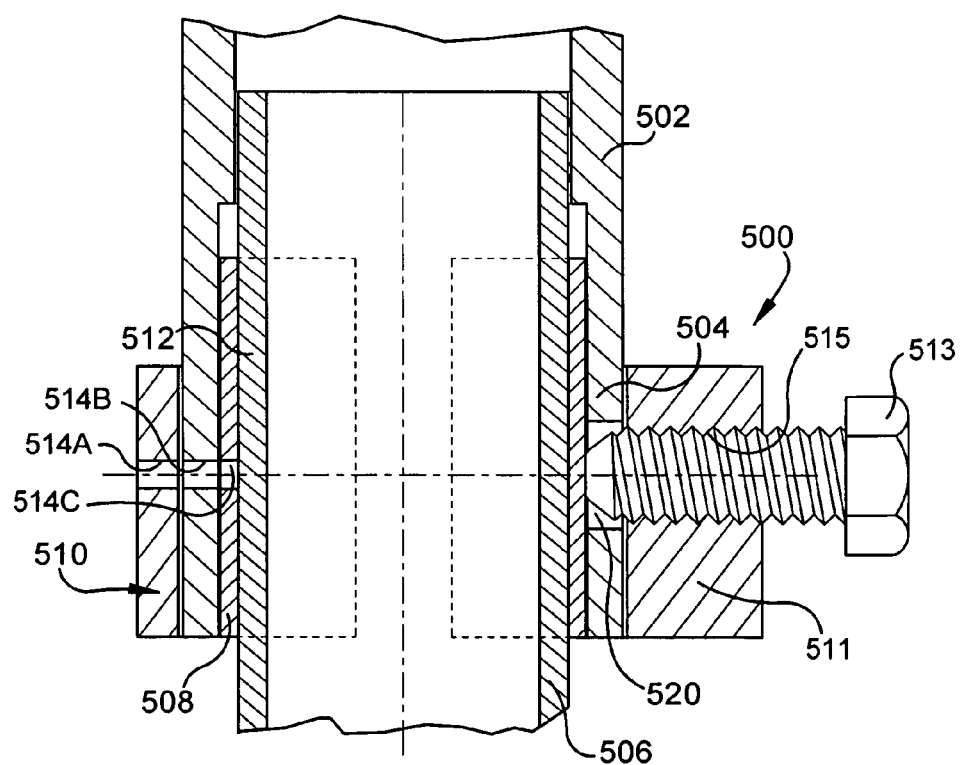
FIG. 21 is an illustration of an exemplary footrest adjustment assembly.

Still another aspect of the present application is a footrest adjustment assembly. FIGS. 1, 1A, and 18-21 illustrate an exemplary footrest adjustment assembly 500 that eliminates the need to provide a relief slit (shown in phantom in FIG. 19 for illustration purposes, not actually included) in a footrest support mounting tube 502. Instead, the footrest support mounting tube 502 has an end portion 504 with a constant circular cross-section (see FIG. 20). Referring to FIG. 21, the components of the illustrated footrest adjustment assembly are the footrest support mounting tube 502, a footrest support tube 506, a split bushing 508, and a clamp assembly 510. The clamp assembly 510 includes a bracket 511 and a fastener 513. The bracket 511 may be a collar having an opening that accepts the support mounting tube 502 and a radial threaded opening that accepts the fastener 513. The fastener 513 is assembled in a threaded hole 515 in the bracket 511. The footrest support tube 506 extends into the mounting tube 502. The split bushing 508 occupies a space between the mounting tube 502 and the support tube 506. The clamp 510 is disposed around the mounting tube 502 and may be secured to the mounting tube. For example, the clamp 510 may be secured to the tube by an adhesive or by a fastener, such as a pin or rivet (not shown) that extends through aligned openings 514A, 514B, 514C in the bracket 511, support tube 506, and split bushing 508. The fastener 513 extends through a hole 520 in the mounting tube 502. The fastener 513 engages the split bushing 508 and clamps the split bushing against the footrest support tube 506 to secure the footrest support tube in the mounting tube 502.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

The invention claimed is:

1. A wheelchair frame member comprising:
   a) a first metallic tubular member;
   b) a second metallic tubular member; and
   c) a curved composite tubular member including a first end portion that extends into the first metallic tubular member and a second end portion that extends into the second metallic tubular member, wherein the first and second metallic tubular members and the first and second ends of the curved composite tubular portion are joined together by:
   i) positioning an inflatable mandrel within material that forms the curved composite tubular member;
   ii) placing a portion of the material that forms the first end portion of the curved composite member into the first metallic tubular member;
   ii) placing a portion of the material that forms the second end portion of the curved composite portion into the second metallic tubular member;
   iii) placing the inflatable mandrel, metallic tubular members, and the material that forms the curved composite tubular member into a mold having a curved portion that corresponds to the curved composite tubular member;
   iv) heating the material that forms the composite tubular portion; and
   v) inflating the mandrel to force the material that forms the composite tubular member against inner surfaces of the metallic tubular members and against a surface of the mold.

2. The wheelchair frame member of claim 1 wherein outer dimensions of the first metallic tubular member, and the composite tubular member are substantially the same.

3. The wheelchair of claim 1 wherein the composite tubular portion further comprises ribs extending radially inward from an interior surface of the composite tubular portion.

4. The wheelchair of claim 1 wherein the composite tubular portion includes first and second linear end portions that are connected by a curved portion of the composite tubular portion.

5. A wheelchair comprising:
   a) a pair of drive wheels;
   b) a frame supported by the drive wheels, the frame including a frame member that comprises a metallic tubular portion and a composite tubular portion, the composite tubular portion including an end portion that extends into the metallic tubular portion, wherein the metallic tubular portion and the composite tubular portion are joined together by:
      i) positioning an inflatable mandrel within material that forms the composite tubular portion;
      ii) placing a portion of the material that forms the end portion of the composite portion into the metallic tubular portion;
      iii) placing the inflatable mandrel, metallic tubular portion, and the material that forms the composite tubular portion into a mold;
      iv) heating the material that forms the composite tubular portion; and
      v) inflating the mandrel to force the material that forms the composite tubular portion against an inner surface of the metallic tubular portion and against a surface of the mold.

6. The wheelchair of claim 5 wherein outer dimensions of the metallic tubular portion and the composite tubular portion are substantially the same.

7. The wheelchair of claim 5 wherein the composite tubular portion further comprises ribs extending radially inward from an interior surface of the composite tubular portion.

8. The wheelchair of claim 5 wherein the composite tubular portion includes first and second linear end portions that are connected by a curved portion of the composite tubular portion.

9. The wheelchair of claim 5 wherein the composite tubular portion comprises carbon fiber.

10. The wheelchair of claim 5 wherein the metallic tubular portion comprises titanium.

* * * * *

UNITED STATES PATENT AND TRADEMARK OFFICE
CERTIFICATE OF CORRECTION

| | | |
|---|---|---|
| PATENT NO. | : 7,520,518 B2 | Page 1 of 1 |
| APPLICATION NO. | : 11/258488 | |
| DATED | : April 21, 2009 | |
| INVENTOR(S) | : Christopher J. Peterson et al. | |

It is certified that error appears in the above-identified patent and that said Letters Patent is hereby corrected as shown below:

Column 10, Line 52, please delete "ii" and insert --iii--

Column 10, Line 55, please delete "iii" and insert --iv--

Column 10, Line 59, please delete "iv" and insert --v--

Column 10, Line 61, please delete "v" and insert --vi--

Signed and Sealed this

Twenty-sixth Day of May, 2009

JOHN DOLL
*Acting Director of the United States Patent and Trademark Office*